(12) United States Patent
Cahill

(10) Patent No.: US 10,053,068 B2
(45) Date of Patent: Aug. 21, 2018

(54) SYSTEMS AND METHODS FOR BRAKE CONTROL

(71) Applicant: Goodrich Corporation, Charlotte, NC (US)

(72) Inventor: Eric Cahill, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 208 days.

(21) Appl. No.: 15/221,559

(22) Filed: Jul. 27, 2016

(65) Prior Publication Data

US 2018/0029567 A1 Feb. 1, 2018

(51) Int. Cl.
*B60T 8/17* (2006.01)
*B64C 25/44* (2006.01)
*B60T 17/22* (2006.01)

(52) U.S. Cl.
CPC .......... *B60T 8/1703* (2013.01); *B60T 17/221* (2013.01); *B64C 25/44* (2013.01); *B60T 2270/404* (2013.01); *B60T 2270/413* (2013.01)

(58) Field of Classification Search
CPC ...... B60T 8/1703; B60T 17/221; B60T 25/44; B60T 2270/404; B60T 2270/413; B60T 8/885; B60T 2270/82
See application file for complete search history.

(56) References Cited

U.S. PATENT DOCUMENTS

| | | | |
|---|---|---|---|
| 5,201,478 A * | 4/1993 | Wooley | B64C 1/00 244/120 |
| 7,618,100 B2 * | 11/2009 | Griffith | B60T 8/1703 303/126 |
| 7,766,431 B2 * | 8/2010 | Griffith | B60T 7/12 303/126 |
| 8,974,012 B2 * | 3/2015 | Griffith | B60T 7/12 303/126 |
| 9,139,292 B2 | 9/2015 | Cahill | |
| 9,227,608 B2 | 1/2016 | Hill et al. | |
| 2008/0150353 A1 * | 6/2008 | Griffith | B60T 7/12 303/126 |
| 2015/0151728 A1 | 6/2015 | Iordanidis et al. | |

FOREIGN PATENT DOCUMENTS

| | | |
|---|---|---|
| CN | 104787311 | 7/2015 |
| EP | 0807888 A1 | 11/1997 |
| GB | 2469891 | 11/2010 |
| WO | 0223688 A2 | 3/2002 |
| WO | 2008144267 A2 | 11/2008 |

OTHER PUBLICATIONS

Rea et al., Boeing 777 High Lift Control System, 1993, IEEE, p. 476-483.*
Extended European Search Report dated Jan. 10, 2018 in European Application No. 17183098.7.

* cited by examiner

*Primary Examiner* — Mcdieunel Marc
(74) *Attorney, Agent, or Firm* — Snell & Wilmer L.L.P.

(57) ABSTRACT

A brake system comprises an inboard brake and an outboard brake. A primary control channel includes a primary outboard (POB) channel coupled to the outboard brake. The primary control channel includes a primary inboard (PIB) channel coupled to the inboard brake. A secondary control channel includes a secondary outboard (SOB) channel coupled to the outboard brake. The secondary control channel includes a secondary inboard (SIB) channel coupled to the inboard brake. The primary control channel is in communication with the secondary control channel.

20 Claims, 6 Drawing Sheets

SYSTEMS AND METHODS FOR BRAKE CONTROL

FIELD

The present disclosure relates to aircraft systems, and, more specifically, to aircraft brake systems.

BACKGROUND

Aircraft often include one or more landing gear that comprise one or more wheels. Each wheel may have a brake that is operatively coupled to the wheel to slow the wheel, and hence the aircraft, during, for example, landing or a rejected takeoff. Aircraft may employ hydraulic or electromechanical braking systems. Some aircraft brake systems adjust the compression of friction disks by controlling a servo valve to adjust the pressure of a hydraulic actuator. Other aircraft brake systems adjust the compression of the friction disks by controlling electronic actuators. Aircraft brake control systems receive input signal(s) indicating a desired braking force or braking torque and may transmit a signal to a brake controller. The signal may direct a brake actuator or brake valve to produce a braking force/torque. However, there may be an error between the signal and the actual braking. For instance, a brake and/or a brake control system may malfunction.

SUMMARY

Systems and methods disclosed herein may be useful for controlling a brake system. In this regard, a brake system may include an inboard brake and an outboard brake. A primary control channel may include a primary outboard (POB) channel coupled to the outboard brake. The primary control channel may include a primary inboard (PIB) channel coupled to the inboard brake. A secondary control channel may include a secondary outboard (SOB) channel coupled to the outboard brake. The secondary control channel may include a secondary inboard (SIB) channel coupled to the inboard brake. The primary control channel may be in communication with the secondary control channel.

In various embodiments, the primary control channel and the secondary control channel may be configured to split control of the inboard brake and the outboard brake. The inboard brake may be configured to receive a command from at least one of the PIB channel or the SIB channel. The outboard brake may be configured to receive a command from at least one of the POB channel or the SOB channel. An inboard brake control unit (BCU) may be coupled to the inboard brake. The inboard BCU may include the PIB channel and the SIB channel. An outboard BCU may be coupled to the outboard brake. The outboard BCU may include the POB channel and the SOB channel. The inboard BCU is disposed remotely from the outboard BCU. The inboard BCU may be disposed remotely from the outboard BCU. The inboard BCU may be disposed in a first line replaceable unit, and the outboard BCU may be disposed in a second line replaceable unit. A communication channel may be disposed between the inboard BCU and the outboard BCU.

A brake system may comprise an inboard brake and an outboard brake. A primary control channel may include a POB channel coupled to the outboard brake and a PIB channel coupled to the inboard brake. A secondary control channel may include a SOB channel coupled to the outboard brake and a SIB channel coupled to the inboard brake. A brake system may comprise tangible, non-transitory memory configured to communicate with a controller, the tangible, non-transitory memory having instructions stored thereon that, in response to execution by the controller, cause the controller to perform operations comprising receiving, by the controller, a first status of the POB channel, a second status of the PIB channel, a third status of the SOB channel and a fourth status of the SIB channel, determining, by the controller, a failure of at least one of the POB channel or the PIB channel based on the first status of the POB channel and the second status of the PIB channel, and comparing, by the controller, the first status of the POB channel and the second status of the PIB channel with the third status of the SOB channel and the fourth status of the SIB channel.

In various embodiments, the primary control channel and the secondary control channel may be configured to split control of the inboard brake and the outboard brake. The operations may further comprise determining, by the controller, a failure of at least one of the SOB channel or the SIB channel based on the third status of the SOB channel and the fourth status of the SIB channel, and splitting, by the controller, control between at least one of the POB channel or the SOB channel and at least one of the PIB channel or the SIB channel. An inboard BCU may be coupled to the inboard brake. The inboard BCU may include the PIB channel and the SIB channel. An outboard BCU may be coupled to the outboard brake. The outboard BCU may include the POB channel and the SOB channel. The inboard BCU is disposed remotely from the outboard BCU. The inboard BCU may be disposed in a first line replaceable unit, and the outboard BCU may be disposed in a second line replaceable unit.

A method for controlling a brake system may comprise the steps of receiving, by a controller, a first status of a POB channel, a second status of a PIB channel, a third status of a SOB channel and a fourth status of a SIB channel, determining, by the controller, a failure of at least one of the POB channel or the PIB channel based on the first status of the POB channel and the second status of the PIB channel, and comparing, by the controller, the first status of the POB channel and the second status of the PIB channel with the third status of the SOB channel and the fourth status of the SIB channel.

In various embodiments, the method may further include determining, by the controller, a failure of at least one of the SOB channel or the SIB channel based on the third status of the SOB channel and the fourth status of the SIB channel. The method may further include splitting, by the controller, control between at least one of the POB channel or the SOB channel and at least one of the PIB channel or the SIB channel.

The method may further include determining, by the controller, a passing status of at least one of the SOB channel or the SIB channel based on the third status of the SOB channel and the fourth status of the SIB channel. The method may further include transferring, by the controller, control to the SOB channel and the SIB channel based on the passing status of at least one of the third status of the SOB channel and the fourth status of the SIB channel. The method may further include determining, by the controller, a failure the SOB channel or the SIB channel based on the third status of the SOB channel and the fourth status of the SIB channel, and maintaining, by the controller, control by the PIB channel and the POB channel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
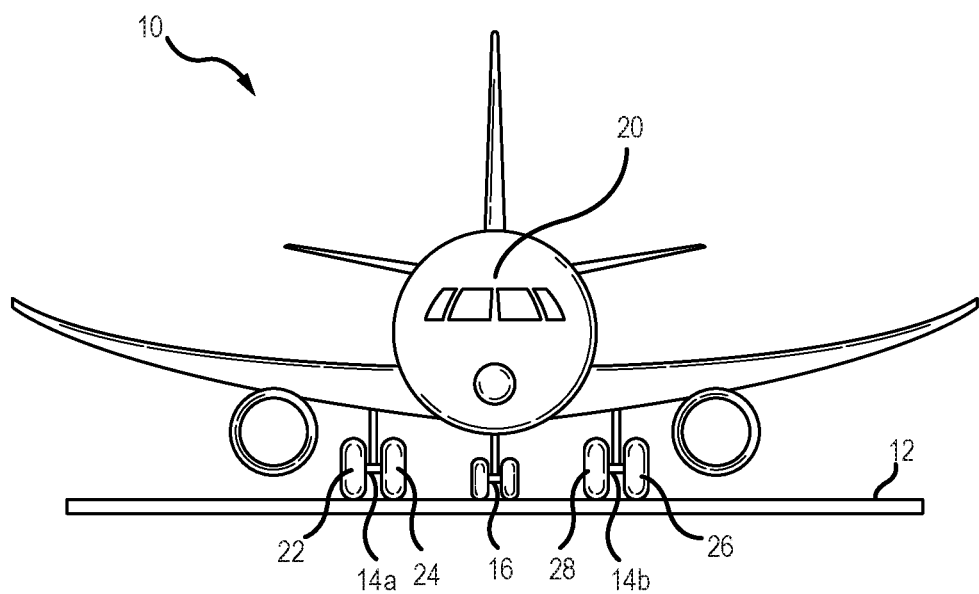
FIG. 1 illustrates an aircraft in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft. As used herein, "forward" refers to the direction associated with the nose (e.g., the front end) of an aircraft, or generally, to the direction of flight or motion.

Aircraft may comprise one or more types of aircraft wheel and brake assemblies. For example, an aircraft wheel and brake assembly may comprise a non-rotatable wheel support, a wheel mounted to the wheel support for rotation, and a brake disk stack. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk pack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be electrically operated actuator rams or hydraulically operated actuator rams, although some brakes may use pneumatically operated actuator rams.

In brake systems that employ fluid powered (hydraulic or pneumatic power) actuator rams, the actuator ram may be coupled to a power source via a brake servo valve (BSV) and a shutoff valve (SOV). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. Based on braking commands from the pilot (often via an electronic controller that may implement, for example, anti-skid logic), the BSV controls the amount of fluid pressure provided to the actuator ram, and thus, the braking force applied to the wheel. To prevent or minimize unintentional braking (e.g., due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram, and thus, braking cannot be effected.

In electronic brakes, a brake controller (or controller) is coupled to one or more electromechanical actuator controllers (EMACs) for a brake, which drives one or more electromechanical brake actuators. The brake controller may be in communication with a brake pedal, and thus may control the EMACs in accordance with pilot/copilot braking commands. In various aircraft, other means are used to compress a brake disk stack. A brake controller may comprise a processor and a tangible, non-transitory memory. The brake controller may comprise one or more logic modules that implement brake logic. In various embodiments, the brake controller may comprise other electrical devices to implement brake logic.

Each braking wheel may have at least one electromechanical actuator (EMA) for providing a clamping force to the brake for that wheel, which converts the clamping force to a braking torque. EMACs may be disposed within the landing gear bay and electrically connected to a plurality of brake EMAs coupled to wheel and brake groups. Typically, each wheel and brake group includes a plurality of brake EMAs coupled via a brake assembly to a wheel. The EMACs interpret the brake force commands from the brake controller and receive electrical power to provide power to drive the EMAs.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

With reference to FIG. 1, an aircraft 10 on a runway 12 is shown in accordance with various embodiments. Aircraft 10 may comprise right landing gear 14a and left landing gear 14b. Nose landing gear 16 is located under the nose of aircraft 10 and may not include a brake. Each landing gear is illustrated in FIG. 1, for example, as having two wheels. For example, right landing gear 14a may comprise a plurality of wheels, such as a right outboard (ROB) wheel 22 and a right inboard (RIB) wheel 24. Left landing gear 14b may comprise a plurality of wheels, such as a left outboard (LOB) wheel 26 and a left inboard (LIB) wheel 28. In various embodiments, aircraft 10 may comprise any number of landing gears and each landing gear may comprise any number of wheels.

Figure 2:
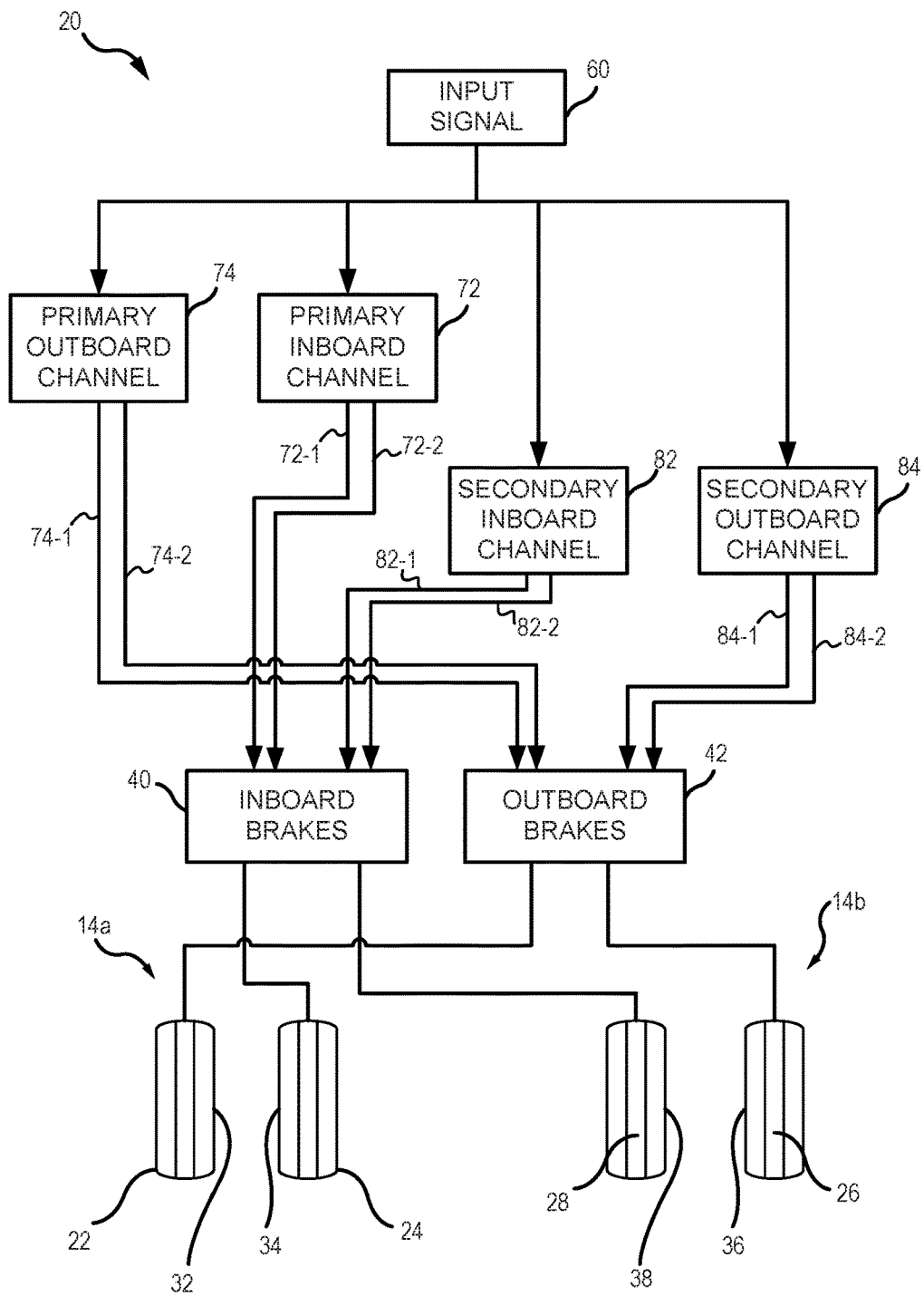
FIG. 2 illustrates a schematic view of a brake system for an aircraft, in accordance with various embodiments.

With reference to FIGS. 1 and 2, aircraft 10 may include a brake system 20, which may be applied to any wheel of the landing gear. Brake system 20 may comprise a brake control system of aircraft 10. Brake system 20 of aircraft 10 may be a collection of subsystems that produce output signals for controlling the braking force and/or torque applied to each of wheels 22, 24, 26, 28. Brake system 20 may communicate with the brakes of right landing gear 14a and left landing gear 14b. Right landing gear 14a may include a ROB brake 32 and a RIB brake 34 coupled to ROB wheel 22 and RIB wheel 24, respectively. ROB brake 32 and RIB brake 34 may be mounted to ROB wheel 22 and RIB wheel 24, respectively, to apply and release braking force on each respective wheel. Left landing gear 14b may include an LOB brake 36 and a LIB brake 38 coupled to LOB wheel 26 and LIB wheel 28, respectively. LOB brake 36 and LIB brake 38 may be mounted to LOB wheel 26 and LIB wheel 28, respectively, to apply and release braking force on each respective wheel. RIB brake 34 and LIB brake 38 may be referred to, collectively, as inboard brakes 40. ROB brake 32 and LOB brake 36 may be referred to, collectively, as outboard brakes 42.

With reference to FIG. 2, brake system 20 is shown schematically having architecture in accordance with various embodiments. Brake system 20 may include at least one upper level controller, or brake control unit (BCU), for providing overall control of the braking system. Brake system 20 may interpret input commands or input signals 60 from the aircraft cockpit controls and avionics and may issue braking force commands to inboard brakes 40 and outboard brakes 42. In various embodiments, brake system 20 may include a primary inboard (PIB) channel 72, a primary outboard (POB) channel 74, a secondary inboard (SIB) channel 82 and a secondary outboard (SOB) channel 84.

Each of PIB channel 72 and SIB channel 82 may be coupled to or in electrical communication with inboard brakes 40. Inboard brakes 40 may be configured to receive a command through either of PIB channel 72 or SIB channel 82, such that inboard brakes 40 may be controlled by PIB channel 72 or SIB channel 82. Each of POB channel 74 and SOB channel 84 may be coupled to or in electrical communication with outboard brakes 42. Outboard brakes 42 may be configured to receive a command through either of POB channel 74 or SOB channel 84, such that outboard brakes 42 may be controlled by POB channel 74 or SOB channel 84.

PIB channel 72 may further include dual redundant communication channels. For example, PIB channel 72 may include a first PIB channel 72-1 and a second PIB channel 72-2. POB channel 74 may further include dual redundant communication channels, such that POB channel 74 includes a first POB channel 74-1 and a second POB channel 74-2. SIB channel 82 may further include dual redundant communication channels, such that SIB channel 82 includes a first SIB channel 82-1 and a second SIB channel 82-2. SOB channel 84 may further include dual redundant communication channels, such that SOB channel 84 includes a first SOB channel 84-1 and a second SOB channel 84-2.

Each of PIB channel 72, POB channel 74, SIB channel 82 and SOB channel 84 may comprise a communication or data bus that is compliant with Aeronautical Radio, Incorporated (ARINC) reference standards. PIB channel 72, POB channel 74, SIB channel 82, and SOB channel 84 may be housed in one or more BCUs or ARINC units. Each of PIB channel 72, POB channel 74, SIB channel 82, and SOB channel 84 may be housed in separate units or the same unit. For example, POB channel 74 and SOB channel 84 may be housed in an outboard unit, while PIB channel 72 and SIB channel 82 may be housed in an inboard unit (see FIG. 3). PIB channel 72 and POB channel 74 may be housed in a primary unit, while SIB channel 82 and SOB channel 84 may be housed in a secondary unit (see FIG. 4). Each of PIB channel 72, POB channel 74, SIB channel 82 and SOB channel 84 may be housed in separate individual units. Brake system 20 provides primary and secondary control to inboard brakes 40 and outboard brakes 42, wherein the control may be independent of the physical housing of channels 72, 74, 82, 84.

Figure 3:
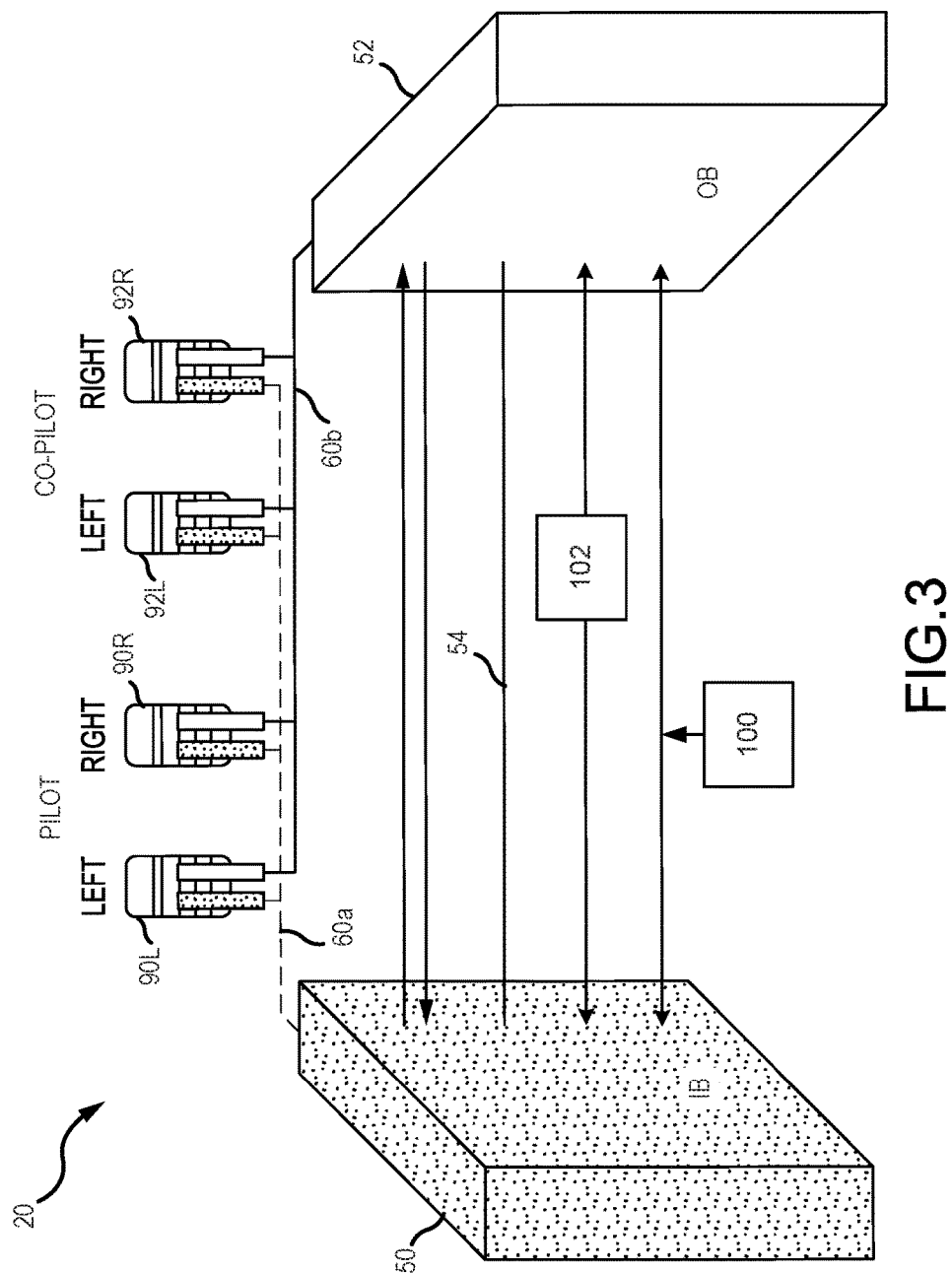
FIG. 3 illustrates a schematic view of a brake system architecture, in accordance with various embodiments.

With reference now to FIG. 3 and still to FIG. 2, brake system 20 is shown schematically having architecture in accordance with various embodiments. In various embodiments, brake system 20 may include two BCUs, wherein a first BCU may be an inboard BCU 50 and a second BCU may be an outboard BCU 52. Two or more BCUs, such as BCUs 50, 52 may be present so as to provide redundancy to the braking system 20. BCUs 50, 52 may comprise dual redundant BCUs and may be configured to carryout braking operations of the aircraft. Brake system 20 may include a brake control algorithm executed by BCUs 50, 52 through PIB channel 72, POB channel 74, SIB channel 82, and SOB channel 84. In various embodiments, BCUs 50, 52 may include or communicate with one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

Inboard BCU 50 may be coupled to or in electrical communication with inboard brakes 40, including RIB brake 34 and LIB brake 38. Inboard BCU 50 may include PIB channel 72 and SIB channel 82. Outboard BCU 52 may be coupled to or in electrical communication with outboard brakes 42, including ROB brake 32 and LOB brake 36. Outboard BCU 52 may include POB channel 74 and SOB channel 84. Further, a communication channel 54 may be disposed between inboard BCU 50 and outboard BCU 52. Communication channel 54 may be a data bus, such as a controller area network (CAN) bus. BCU status information may be communicated between inboard BCU 50 and outboard BCU 52.

BCUs 50, 52 may be configured to receive various operator inputs, such as left and right pilot brake pedal signals from left and right pilot brake pedals 90L and 90R, and left and right co-pilot brake pedal signals from left and right co-pilot brake pedals 92L and 92R. Pedal deflection may be interpreted as a command for a given level of deceleration. The brake pedal signals can be generated, for example, via LVDTs (linear variable differential transformers) operatively coupled to the respective pedals. As the pedals are depressed, each LVDT generates a voltage signal corresponding to the degree of pedal deflection, and this voltage signal can be provided to BCUs 50, 52 as inboard signals 60a to inboard BCU 50 and as outboard signals 60b to outboard BCU 52. The pedals 90L, 90R, 92L, 92R provide braking commands from the pilot and co-pilot. The BCUs 50, 52 determine a response to the braking command. For example, a force command and/or brake actuation instructions may be derived from an interpretation of brake pedal application from pilot and/or co-pilot input (e.g., an amount of brake pedal deflection). As will be appreciated, other methods for generating the brake pedal signals may also be employed, including encoders, potentiometers, or the like.

In various embodiments, BCUs 50, 52 may be configured to derive the brake force signal based on brake data generated by the pedals 90L, 90R, 92L, 92R. Brake system 20 may further include autobrake 100 and anti-skid 102 functions. BCUs 50, 52 may receive operator inputs, such as data from an autobrake 100 for configuring autobrake logic. The autobrake 100 may include several settings, such as an enable/disable input, an auto braking level input, and a rejected take off (RTO) input. When autobrake 100 is enabled, BCUs 50, 52 may receive and interpret an auto braking level input, and may issue braking force commands according to the input from autobrake 100. Anti-skid 102 may further control the force command and/or brake actuation instructions from autobrake 100. Deflection of a pedal 90L, 90R, 92L, 92R may disable autobrake 100. Where autobrake 100 is not enabled, brake data generated by the pedals 90L, 90R, 92L, 92R are subject to intervention from anti-skid 102 and other logic of the BCUs 50, 52. The force commands and/or brake actuation instructions may include input signals 60a, 60b from pedals 90L, 90R, 92L, 92R and/or input from autobrake 100 corresponding to a desired aircraft deceleration rate. BCUs 50, 52 may also receive other aircraft data, such as discrete data (e.g., sensor data such as weight-on-wheels, landing gear up/down, etc.), analog data (e.g., force data, temperature data, etc.) or other data from aircraft sensors or aircraft avionics data.

In various embodiments, inboard BCU 50 and outboard BCU 52 are disposed remotely with respect to each other. Physically separating inboard BCU 50 from outboard BCU 52 may reduce the likelihood of a simultaneous failure of both BCUs 50, 52. Inboard BCU 50 and outboard BCU 52 may each be line replaceable units (LRUs) or may be disposed in LRUs. An LRU may be a component, for example, in an aircraft or vehicle that can be replaced.

Figure 4:
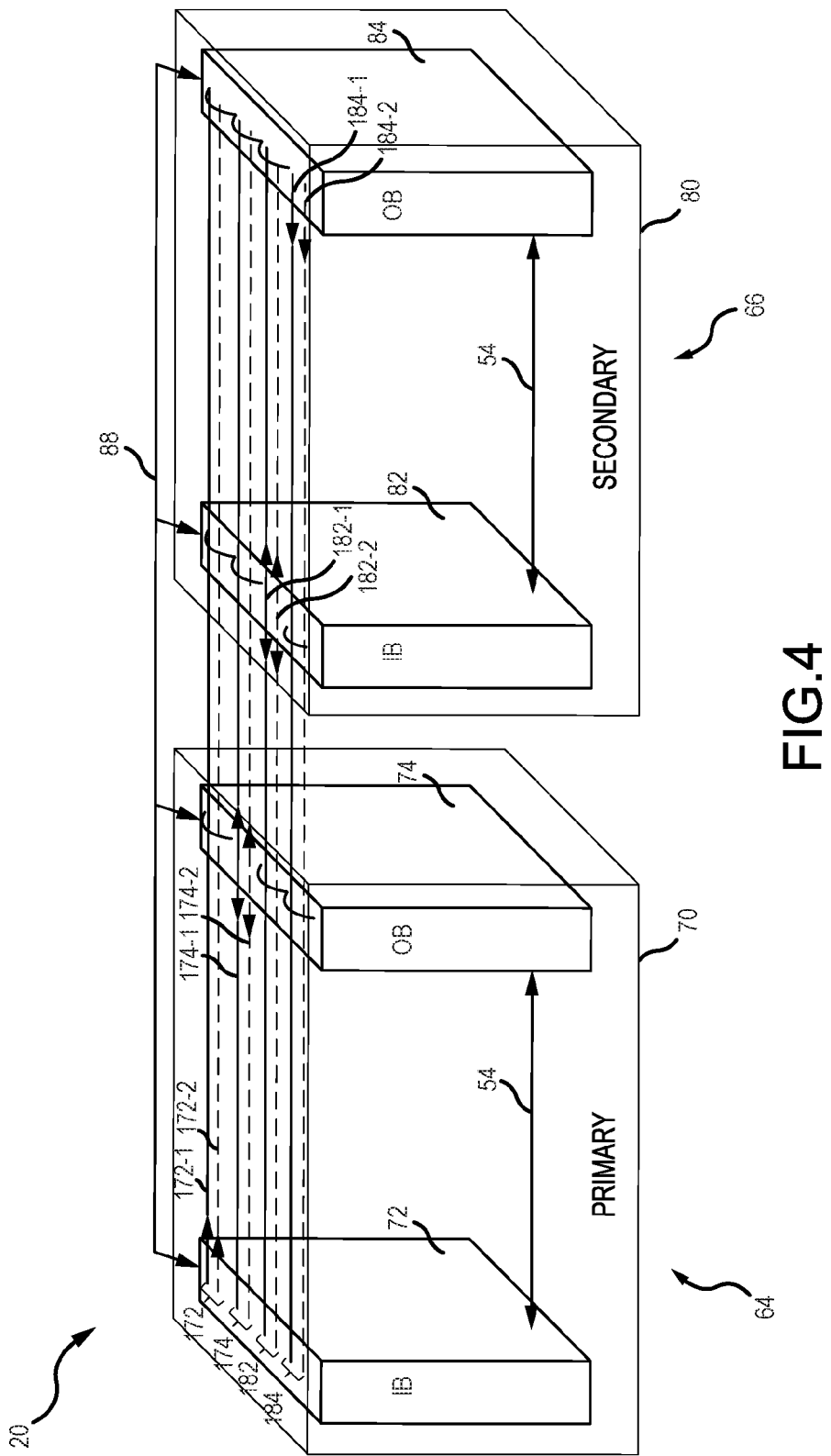
FIG. 4 illustrates a schematic view of a brake system architecture, in accordance with various embodiments.

With reference to FIG. 4, brake system 20 is shown schematically having architecture in accordance with various embodiments. Brake system 20 may comprise primary architecture 64 and secondary architecture 66. Primary architecture 64 may comprise a primary control channel 70 and may comprise a primary BCU. Primary control channel 70 may include an inboard channel and an outboard channel, such as PIB channel 72 and POB channel 74. Secondary architecture 66 may comprise a secondary control channel 80 and may comprise a secondary BCU. Secondary control channel 80 may include an inboard channel and an outboard channel, such as SIB channel 82 and SOB channel 84.

Referring momentarily to FIG. 3 and still to FIG. 4, primary architecture 64 may comprise a primary channel of an inboard BCU 50, such as PIB channel 72, and a primary channel of an outboard BCU 52, such as POB channel 74. Secondary architecture 66 may comprise a secondary channel of an inboard BCU 50, such as SIB channel 82, and a secondary channel of an outboard BCU 52, such as SOB channel 84.

Returning to FIG. 4 in accordance with various embodiments, a communication channel 88 may be disposed between primary control channel 70 and secondary control channel 80. Communication channel 88 may be a CAN bus and may include one or more CAN busses or multi-CANs. Status information may be communicated between primary control channel 70 and secondary control channel 80. Brake system 20 may include a brake control algorithm executed one or more BCUs of primary architecture 64 and secondary architecture 66.

In various embodiments, primary control channel 70 may input a PIB channel status 172 of PIB channel 72 and a POB channel status 174 of POB channel 74 into secondary control channel 80 through communication channel 88. Secondary control channel 80 may be configured to receive the input status from primary control channel 70. Similarly, secondary control channel 80 may input a SIB channel status 182 of SIB channel 82 and a SOB channel status 184 of SOB channel 84 into primary control channel 70 through communication channel 88. Primary control channel 70 may be configured to receive the input status from secondary control channel 80. Primary control channel 70 and secondary control channel 80 may determine a status of each of channels 72, 74, 82, 84. Based on the status of channels 72, 74, 82, 84, the brake system 20 determines which of channels 72, 74, 82, 84 to activate.

Inputs of the brake control algorithm may include a PIB channel status 172, POB channel status 174, SIB channel status 182 and SOB channel status 184. Where each channel includes redundant communication channels, the inputs may include more than one status input for each channel. A channel status may be determined by measuring a voltage across the channel, and a low or zero voltage may indicate a failed channel or an inactive channel. For example, PIB channel 72 having a first PIB channel 72-1 and a second PIB channel 72-2 may include inputs of a first PIB channel status 172-1 and a second PIB channel status 172-2. In various embodiments, inputs of the brake control algorithm include eight inputs: first PIB channel status 172-1, second PIB channel status 172-2, first POB channel status 174-1, second POB channel status 172-2, second SIB channel status 182-1, SIB channel status 182-2, first SOB channel status 184-1 and second SOB channel status 184-2. In various embodiments, inputs of the brake control algorithm include four inputs, which may be determined using redundant communication channels: PIB channel status 172, POB channel status 174, SIB channel status 182 and SOB channel status 184.

In various embodiments, PIB channel 72 and POB channel 74 of primary control channel 70 may be active at the initialization of brake system 20, while SIB channel 82 and SOB channel 84 of secondary control channel 80 may be inactive at the initialization of brake system 20. PIB channel status 172 and POB channel status 174 may be input into secondary control channel 80, and SIB channel status 182 and SOB channel status 184 may be input into primary control channel 70. Based on the status of the inputs, brake system 20 determines whether to continue with the current channel, switch from primary control channel 70 to secondary control channel 80, switch from secondary control channel 80 to primary control channel 70, or split control between primary control channel 70 and secondary control channel 80. In various embodiments, brake system 20 activates at least one of PIB channel 72 or SIB channel 82 and activates at least one of POB channel 74 or SOB channel 84. A split control of primary channels and secondary channels as well as inboard channels and outboard channels allows brake system 20 to maintain full braking function in cases where partial brake channel failure has occurred.

TABLE 1 illustrates a braking algorithm for brake system 20, in accordance with various embodiments.

channel 72 based on the first status of the POB channel 74 and the second status of the PIB channel 72.

Step 206 may comprise comparing, by the controller, the first status of the POB channel 74 and the second status of the PIB channel 72 with the third status of the SOB channel 84 and the fourth status of the SIB channel 82.

Step 208 may comprise determining, by the controller, a failure of at least one of the SOB channel 84 or the SIB channel 82 based on the third status of the SOB channel 84 and the fourth status of the SIB channel 82.

| | INPUT (STATUS) | | | | OUTPUT | | | |
|---|---|---|---|---|---|---|---|---|
| | Primary | | Secondary | | | Primary | | Secondary | |
| | IB | OB | IB | OB | Switch | IB | OB | IB | OB |
| A | PASS | PASS | PASS | FAILED | NO | ACTIVE-OPERABLE | ACTIVE-OPERABLE | INACTIVE | INACTIVE |
| B | PASS | PASS | FAILED | PASS | NO | ACTIVE-OPERABLE | ACTIVE-OPERABLE | INACTIVE | INACTIVE |
| C | PASS | PASS | FAILED | FAILED | NO | ACTIVE-OPERABLE | ACTIVE-OPERABLE | INACTIVE | INACTIVE |
| D | PASS | FAILED | PASS | PASS | YES | INACTIVE | INACTIVE | ACTIVE-OPERABLE | ACTIVE-OPERABLE |
| E | PASS | FAILED | PASS | FAILED | YES | INACTIVE | INACTIVE | ACTIVE-OPERABLE | ACTIVE-INOPERABLE |
| F | PASS | FAILED | FAILED | PASS | SPLIT | ACTIVE-OPERABLE | INACTIVE | INACTIVE | ACTIVE-OPERABLE |
| G | PASS | FAILED | FAILED | FAILED | NO | ACTIVE-OPERABLE | ACTIVE-INOPERABLE | INACTIVE | INACTIVE |
| H | FAILED | PASS | PASS | PASS | YES | INACTIVE | INACTIVE | ACTIVE-OPERABLE | ACTIVE-OPERABLE |
| I | FAILED | PASS | PASS | FAILED | SPLIT | INACTIVE | ACTIVE-OPERABLE | ACTIVE-OPERABLE | INACTIVE |
| J | FAILED | PASS | FAILED | PASS | YES | INACTIVE | INACTIVE | ACTIVE-INOPERABLE | ACTIVE-OPERABLE |
| K | FAILED | PASS | FAILED | FAILED | NO | ACTIVE-INOPERABLE | ACTIVE-OPERABLE | INACTIVE | INACTIVE |
| L | FAILED | FAILED | PASS | PASS | YES | INACTIVE | INACTIVE | ACTIVE-OPERABLE | ACTIVE-OPERABLE |
| M | FAILED | FAILED | PASS | FAILED | YES | INACTIVE | INACTIVE | ACTIVE-OPERABLE | ACTIVE-INOPERABLE |
| N | FAILED | FAILED | FAILED | PASS | YES | INACTIVE | INACTIVE | ACTIVE-INOPERABLE | ACTIVE-OPERABLE |
| O | FAILED | FAILED | FAILED | FAILED | YES | INACTIVE | INACTIVE | ACTIVE-INOPERABLE | ACTIVE-INOPERABLE |

Figure 5:
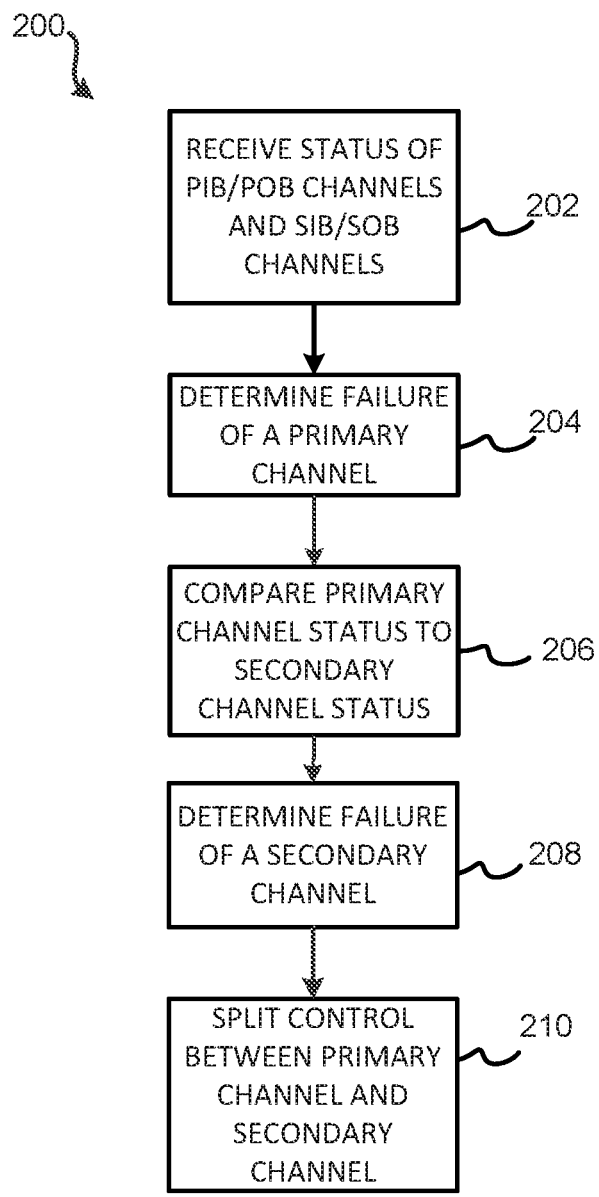
FIG. 5 illustrates a method of controlling a brake system, in accordance with various embodiments.

FIG. 5 illustrates a method 200 of controlling a brake system, in accordance with various embodiments. A controller capable of carrying out the steps of FIG. 5 may be a brake system controller which may include PIB channel 72, POB channel 74, SIB channel 82, and SOB channel 84 of brake system 20, which may include one or more BCUs. Method 200 may include the steps of receiving a status of primary IB/OB channels and secondary IB/OB channels (step 202), determining failure of a primary channel (step 204), comparing a primary channel status to a secondary channel status (step 206), determining failure of a secondary channel (step 208), and splitting control between the primary channel and secondary channel (step 210).

Step 202 may comprise receiving, by the controller, a first status, which may be a status of POB channel 74. Step 202 may comprise receiving a second status, which may be a status of PIB channel 72. Step 202 may comprise receiving a third status, which may be a status of SOB channel 84. Step 202 may comprise receiving a fourth status, which may be a status of SIB channel 82. Step 202 may further comprise receiving a status of redundant channels.

Step 204 may comprise determining, by the controller, a failure of at least one of the POB channel 74 or the PIB Step 210 may comprise splitting, by the controller, control of the inboard BCU 50 and the outboard BCU 52 between at least one of the POB channel 74 or the SOB channel 84 and at least one of the PIB channel 72 or the SIB channel 82. For example, Table 1 illustrates examples of split control of the inboard BCU 50 and the outboard BCU 52. Case F in Table 1 shows POB channel 74 has failed and SIB channel 82 has failed, while PIB channel 72 and SOB channel 84 show a status of passing. As a result, control of inboard BCU 50 and outboard BCU 52 are split such that PIB channel 72 activates inboard BCU 50 while SOB channel 84 activates outboard BCU 52. As a further example, Case I in Table 1 shows PIB channel 72 has failed and SOB channel 84 has failed, while POB channel 74 and SIB channel 82 show a status of passing. As a result, control of inboard BCU 50 and outboard BCU 52 are split such that SIB channel 82 activates inboard BCU 50 while POB channel 74 activates outboard BCU 52.

Figure 6:
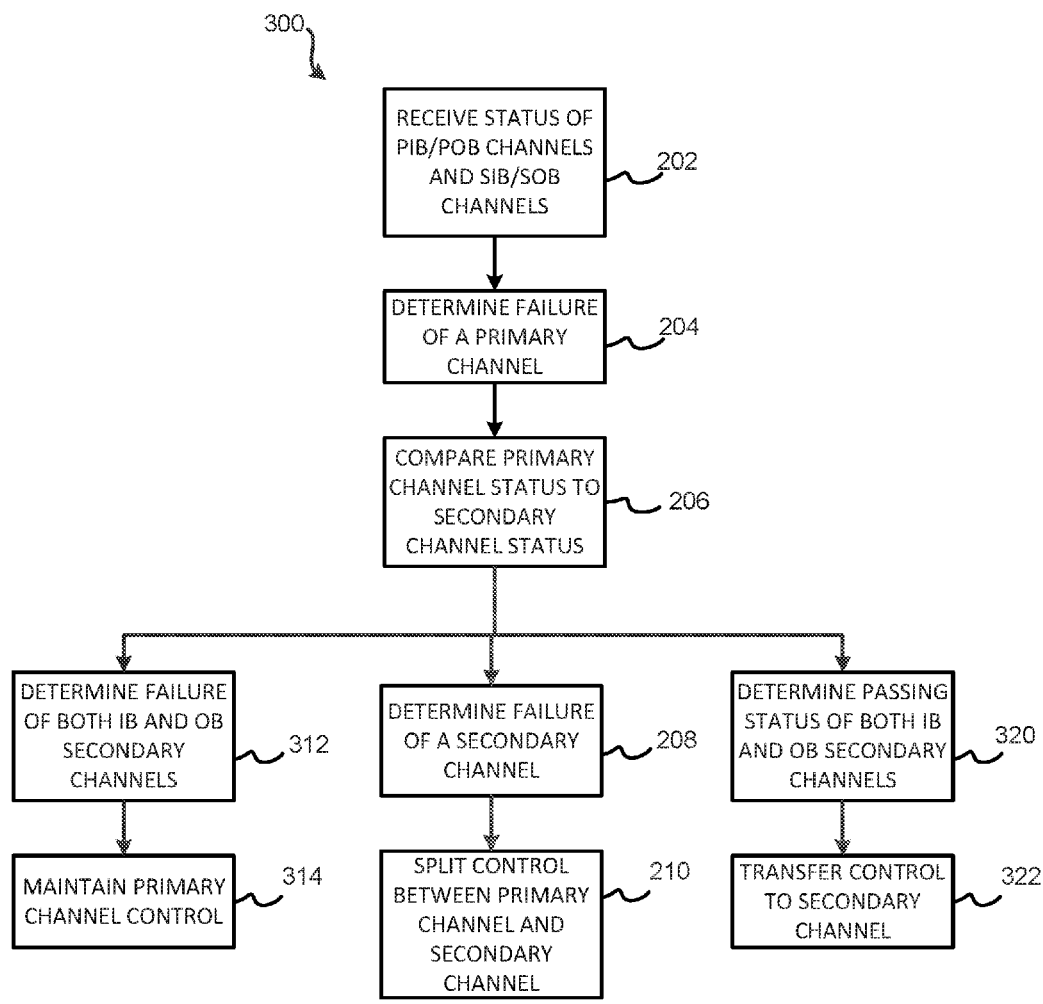
FIG. 6 illustrates a method of controlling a brake system, in accordance with various embodiments.

FIG. 6 illustrates a method 300 of controlling a brake system, in accordance with various embodiments. Method 300 may include the steps of method 200 in FIG. 5, and may additionally include the steps of determining failure of both IB and OB secondary channels (step 312), maintaining a primary channel control (step 314). Method 300 may include the steps of determining a passing status of both IB and OB secondary channels (step 320), and transferring control to the secondary channel (step 322).

Step 312 may comprise determining, by the controller, a failure of both the SOB channel 84 and the SIB channel 82 based on the third status of the SOB channel and the fourth status of the SIB channel 82. Step 314 may comprise maintaining, by the controller, control of the inboard BCU 50 and outboard BCU 52 with PIB channel 72 and POB channel 74.

Step 320 may comprise determining, by the controller, a passing status of at least one of the SOB channel 84 or the SIB channel 82 based on the third status of the SOB channel 84 and the fourth status of the SIB channel 82. Step 320 may comprise transferring, by the controller, control to the SOB channel 84 and the SIB channel 82 based on the passing status of at least one of the third status of the SOB channel 84 and the fourth status of the SIB channel 82.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake system, comprising:
an inboard brake;
an outboard brake;
a primary control channel including a primary outboard (POB) channel coupled to the outboard brake and a primary inboard (PIB) channel coupled to the inboard brake; and
a secondary control channel including a secondary outboard (SOB) channel coupled to the outboard brake and a secondary inboard (SIB) channel coupled to the inboard brake,
wherein the primary control channel is in communication with the secondary control channel through a communication channel;
wherein the primary control channel determines a first status of the POB channel by measuring a first current or a first voltage across the POB channel;
wherein the primary control channel determines a second status of the PIB channel by measuring a second current or a second voltage across the PIB channel;
wherein the secondary control channel determines a third status of the SOB channel by measuring a third current or a third voltage across the SOB channel;
wherein the secondary control channel determines a fourth status of the SIB channel by measuring a fourth current or a fourth voltage across the SIB channel; and
wherein the brake system determines whether to activate the POB channel based on the first status, the PIB channel based on the second status, the SOB channel based on the third status, and the SIB channel based on the fourth status.

2. The brake system of claim 1, wherein the primary control channel and the secondary control channel are configured to split control of the inboard brake and the outboard brake.

3. The brake system of claim 1, wherein the inboard brake is configured to receive a command from at least one of the PIB channel or the SIB channel.

4. The brake system of claim 1, wherein the outboard brake is configured to receive a command from at least one of the POB channel or the SOB channel.

5. The brake system of claim 1, further including:
an inboard brake control unit (BCU) coupled to the inboard brake, wherein the inboard BCU includes the PIB channel and the SIB channel; and
an outboard BCU coupled to the outboard brake, wherein the outboard BCU includes the POB channel and the SOB channel.

6. The brake system of claim 5, wherein the inboard BCU is disposed remotely from the outboard BCU.

7. The brake system of claim 5, wherein the inboard BCU is disposed in a first line replaceable unit and the outboard BCU is disposed in a second line replaceable unit.

8. The brake system of claim 5, further including a communication channel disposed between the inboard BCU and the outboard BCU.

9. A brake system, comprising:
an inboard brake;
an outboard brake;

a primary control channel including a primary outboard (POB) channel coupled to the outboard brake and a primary inboard (PIB) channel coupled to the inboard brake;

a secondary control channel including a secondary outboard (SOB) channel coupled to the outboard brake and a secondary inboard (SIB) channel coupled to the inboard brake; and a tangible, non-transitory memory configured to communicate with a controller, the tangible, non-transitory memory having instructions stored thereon that, in response to execution by the controller, cause the controller to perform operations comprising:

receiving, by the controller, a first status of the POB channel, a second status of the PIB channel, a third status of the SOB channel and a fourth status of the SIB channel, determining, by the controller, a failure of at least one of the POB channel or the PIB channel based on the first status of the POB channel and the second status of the PIB channel, comparing, by the controller, the first status of the POB channel and the second status of the PIB channel with the third status of the SOB channel and the fourth status of the SIB channel, and determining whether to activate the POB channel based on the first status, the PIB channel based on the second status, the SOB channel based on the third status, and the SIB channel based on the fourth status.

10. The brake system of claim 9, wherein the primary control channel and the secondary control channel are configured to split control of the inboard brake and the outboard brake.

11. The brake system of claim 9, wherein the operations further comprise:

determining, by the controller, a failure of at least one of the SOB channel or the SIB channel based on the third status of the SOB channel and the fourth status of the SIB channel; and splitting, by the controller, control between at least one of the POB channel or the SOB channel and at least one of the PIB channel or the SIB channel.

12. The brake system of claim 9, further including:

an inboard brake control unit (BCU) coupled to the inboard brake, wherein the inboard BCU includes the PIB channel and the SIB channel; and an outboard BCU coupled to the outboard brake, wherein the outboard BCU includes the POB channel and the SOB channel.

13. The brake system of claim 12, wherein the inboard BCU is disposed in a first line replaceable unit and the outboard BCU is disposed in a second line replaceable unit.

14. A method for controlling a brake system, the method comprising:

receiving, by a controller, a first status of a primary outboard (POB) channel, a second status of a primary inboard (PIB) channel, a third status of a secondary outboard (SOB) channel and a fourth status of a secondary inboard (SIB) channel;

determining, by the controller, a failure of at least one of the POB channel or the PIB channel based on the first status of the POB channel and the second status of the PIB channel;

comparing, by the controller, the first status of the POB channel and the second status of the PIB channel with the third status of the SOB channel and the fourth status of the SIB channel; and determining whether to activate the POB channel based on the first status, the PIB channel based on the second status, the SOB channel based on the third status, and the SIB channel based on the fourth status.

15. The method of claim 14, further comprising determining, by the controller, a failure of at least one of the SOB channel or the SIB channel based on the third status of the SOB channel and the fourth status of the SIB channel.

16. The method of claim 15, further comprising splitting, by the controller, control between at least one of the POB channel or the SOB channel and at least one of the PIB channel or the SIB channel.

17. The method of claim 16, wherein the splitting, by the controller, control results in the brake system maintaining control of an inboard brake control unit and an outboard brake control unit.

18. The method of claim 14, further comprising determining, by the controller, a passing status of at least one of the SOB channel or the SIB channel based on the third status of the SOB channel and the fourth status of the SIB channel.

19. The method of claim 18, further comprising transferring, by the controller, control to the SOB channel and the SIB channel based on the passing status of at least one of the third status of the SOB channel and the fourth status of the SIB channel.

20. The method of claim 14, further comprising:

determining, by the controller, a failure the SOB channel or the SIB channel based on the third status of the SOB channel and the fourth status of the SIB channel; and maintaining, by the controller, control by the PIB channel and the POB channel.

* * * * *